United States Patent

Carr

[19]

[11] Patent Number: 6,167,475
[45] Date of Patent: Dec. 26, 2000

[54] DATA TRANSFER METHOD/ENGINE FOR PIPELINING SHARED MEMORY BUS ACCESSES

[75] Inventor: Jeffery D. Carr, Vestal, N.Y.

[73] Assignee: International Business Machines Corporation, Armonk, N.Y.

[21] Appl. No.: 09/111,110

[22] Filed: Jul. 6, 1998

[51] Int. Cl.[7] ............................. G06F 13/16; G06F 13/36; G06F 13/40; G06F 13/366
[52] U.S. Cl. .............................. 710/113; 710/64; 710/61; 711/169; 711/147
[58] Field of Search ................................... 711/148, 146, 711/147, 154, 153, 150, 169; 148/407, 409, 145; 709/213; 710/200, 129, 241, 61, 126, 52, 113, 64

[56] References Cited

U.S. PATENT DOCUMENTS

| | | | |
|---|---|---|---|
| 4,987,529 | 1/1991 | Craft et al. | 710/113 |
| 5,438,666 | 8/1995 | Craft et al. | 711/106 |
| 5,511,226 | 4/1996 | Zilka | 711/146 |
| 5,576,765 | 11/1996 | Cheney et al. | 348/407 |
| 5,625,795 | 4/1997 | Sakakura et al. | 711/148 |
| 6,035,364 | 3/2000 | Lambrecht et al. | 710/129 |

OTHER PUBLICATIONS

"Uninterrupted Multiple Bus Cycle Transfer Mechanism for Computer Systems", IBM Technical Disclosure Bulletin, vol. 37, No. 08, Aug. 1994, pp. 375–378.

"High–Speed Processor Bus Arbitration", IBM Technical Disclosure Bulletin, vol. 28, No. 12, May 1986, pp. 5329–5333.

*Primary Examiner*—Daniel H. Pan
*Attorney, Agent, or Firm*—Heslin & Rothenberg, P.C.; William H. Steinberg, Esq.

[57] ABSTRACT

A data transfer engine, method and article of manufacture are provided for use in a functional unit of an integrated system for enhanced access and transfer of data over a shared data bus. The data transfer technique comprises pipelining data transfer requests onto the shared bus. The technique involves receiving and storing a first transfer parameter set in a primary parameter register within the data transfer structure, and receiving and storing a second transfer parameter set in a secondary parameter register within the transfer structure. Thereafter, data is transferred using the shared memory bus in response to the first transfer parameter set and the second transfer parameter set without relinquishing access to the shared memory bus between transferring of data in response to the different parameter sets. A situational wait decision is preferably implemented in practice to decide whether to pipeline consecutive data transfer requests based upon the characteristics of the first transfer parameter set and/or the second transfer parameter set, as well as the identities of the requesters providing the first transfer parameter set and the second transfer parameter set.

38 Claims, 6 Drawing Sheets

DATA TRANSFER METHOD/ENGINE FOR PIPELINING SHARED MEMORY BUS ACCESSES

TECHNICAL FIELD

This invention relates generally to data request handling and processing within integrated systems, and more particularly, to a data transfer method/engine for a data access controller of a functional unit within an integrated system, which allows pipelining of data transfer requests onto a shared data bus coupling the functional unit with an external device such as memory.

BACKGROUND OF THE INVENTION

Multiple functions are today commonly being integrated onto a single system chip. When initially defining architecture for integration of multiple discrete components onto a single chip, access to external devices can be a critical issue. For example, an MPEG video decoder system often employs external memory for various data areas or buffers such as frame buffers. This external memory is typically implemented using either DRAM or SDRAM technology. In the decoder system, a video decode unit requires immediate access to external memory when needed to prevent starving the video display or on-screen graphics. If the video decoder's request for data is delayed, the picture could be corrupted. Likewise, an on-chip processor, if held from accessing external memory when needed could experience significant performance degradation.

In a typical approach for accessing off-chip devices, each on-chip functional. unit is given access to the needed external device(s) through a data bus dedicated to that particular unit. Although locally efficient for accessing an external device, globally within the integrated system this approach can be less than optimal. For example although each function might have complete access to its own external memory area, there is no shared access between functions of the integrated system. Thus, transferring data from one memory area to another memory area of the system is often needed. This obviously increases data transfers and can degrade performance of the overall system, i.e., compared with a shared bus/memory system. The problem can be particularly significant in attempting to enhance MPEG-2 decoder chip design, such as for inclusion in a "set-top box" chip.

As is well-known, the MPEG-2 standard describes an encoding method that results in substantial bandwidth reduction by a subjective lossy compression followed by a lossless compression. Encoded, compressed digital data is subsequently decompressed and decoded in an MPEG-2 decoder. Video decoding in accordance with the MPEG-2 standard is described in detail in commonly assigned U.S. Pat. No. 5,576,765, entitled "Video Decoder", which is hereby incorporated herein by reference in its entirety.

MPEG-2 video decoder chips have often been designed with data transfer units constructed for dedicated memory accesses. These data transfer units take requests from an arbiter unit internal to the memory controller macro of the decoder and process the requests directly as transfers to and from external dedicated memory, such as dynamic random access memory (DRAM).

In order to enhance existing MPEG decoder designs, however, it is desired to convert from dedicated bus accesses to external memory, to shared bus accesses to external memory. Within such a shared bus environment, the present invention provides an enhanced data transfer engine which allows intelligent pipelining of data transfers to/from, for example, a video decode unit onto the shared bus for transfer of data between the video decode unit and external memory.

DISCLOSURE OF THE INVENTION

Briefly summarized, the invention comprises in one aspect a method of transferring data using a shared memory bus. The method includes: receiving and storing a first transfer parameter set in a primary parameter register; receiving and storing a second transfer parameter set in a secondary parameter register; and transferring data using the shared memory bus in response to the first transfer parameter set and the second transfer parameter set without relinquishing access to the memory bus between transferring of data in response to the first parameter set and transferring of data in response to the second parameter set.

In another aspect, a method is presented for transferring data with a shared data bus. This method includes: accepting a first transfer parameter set from one of a plurality of data requesters and storing the first transfer parameter set in a primary parameter register; dynamically determining whether to wait for a second transfer parameter set from one of the plurality of data requesters, and if waiting, thereafter receiving and storing the second transfer parameter set in a secondary parameter register; subsequent to storing of the second transfer parameter set or if not waiting for the second transfer parameter set, requesting access to the shared data bus and transferring data across the data bus in response to the first transfer parameter set; and if the second transfer parameter set has been received, transferring data across the data bus in response to the second transfer parameter set without relinquishing access to the data bus between the transferring of data in response to the first parameter set and the transferring of data in response to the second parameter set.

In a further aspect, a data transfer engine is provided for a bus access controller of a functional unit in an integrated system having a shared data bus coupling the functional unit to an external device. The data transfer engine includes a primary parameter register and a secondary parameter register. The primary parameter register receives and stores a first transfer parameter set, while the secondary parameter register receives and stores a second transfer parameter set. Control logic is provided for initiating and controlling transfer of data across the shared data bus in response to the first transfer parameter set and the second transfer parameter set without relinquishing access to the shared data bus between transferring of data in response to the first transfer parameter set and transferring of data in response to the second transfer parameter set.

In yet another aspect, a data transfer engine is provided for a bus access controller of a functional unit in an integrated system having a shared data bus coupling the functional unit to an external device. The data transfer engine includes means for accepting a first transfer parameter set from one of a plurality of data registers, and for storing the first transfer parameter set in a primary parameter register; means for determining whether to wait for a second transfer parameter set from one of the plurality of data requesters, and if waiting, for receiving and storing the second transfer parameter set in a secondary parameter register; means for requesting access to the shared data bus and for transferring data with the data bus in response to the first transfer parameter set after storing the second transfer parameter set, or if not waiting for the second transfer parameter set; and means for transferring data with the data bus in response to the second transfer parameter set if the second transfer parameter set has been received. The transferring of data with the data bus in response to the second transfer parameter set is accomplished without relinquishing access to the data bus between the transferring of data in response to the first parameter set and the transferring of data in response to the second parameter set.

In still another aspect, an integrated system is provided which includes at least: one shared data bus and multiple functional units coupled to at least one shared data bus for sending requests thereon to access at least one external device to be coupled to the integrated system. A bus controller is provided for one functional unit of the multiple functional units in the integrated system. The bus controller includes a data transfer engine having a primary parameter register and a secondary parameter register. The primary parameter register receives and stores a first transfer parameter set, while the secondary parameter register receives and stores a second transfer parameter set. The data transfer engine further includes control logic for initiating and controlling transfer of data across a shared data bus of the at least one shared data bus in response to the first transfer parameter set and the second transfer parameter set without relinquishing access to the shared data bus between transferring of data in response to the first transfer parameter set and transferring of data in response to the second transfer parameter set.

Articles of manufacture encompassing the techniques of the above-outlined methods/structures are also described and claimed herein.

Advantageously, a data transfer method/engine in accordance with the present invention can be used within, for example, a set-top box chip for enhanced access to external memory via a data bus shared throughout the chip. A decode unit employing this data transfer engine can communicate with external memory via master/slave protocol on the shared bus, while also employing address pipelining to improve bandwidth on the bus. The method/engine disclosed is designed for a shared bus environment, but is also operable in a dedicated environment. Thus, a data controller in accordance with the present invention can be generic to multiple integrated system configurations. The memory access engine is independent of the type of memory used, and is portable to other chip designs requiring an arbitrated or shared memory subsystem. Further, the data transfer method/engine presented provides performance optimization for burst transfers and can be tuned for a given design, e.g., through the 'wait control' function described herein. The parameter register structures employed by the data transfer engine also ensure data integrity for the length of the data transfers.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

The present invention is described herein in connection with an MPEG-2 decoder, such as discussed in the above-incorporated U.S. Pat. No. 5,576,765. However, the invention is not limited to use with an MPEG-2 decoder, but rather, can be employed in any integrated system having several functions wherein the functions access one or more external devices over at least one shared data bus. By way of example, the invention is particularly described with reference to a video decode unit, and an integrated digital video decode system employing one or more shared memory buses.

Figure 1:
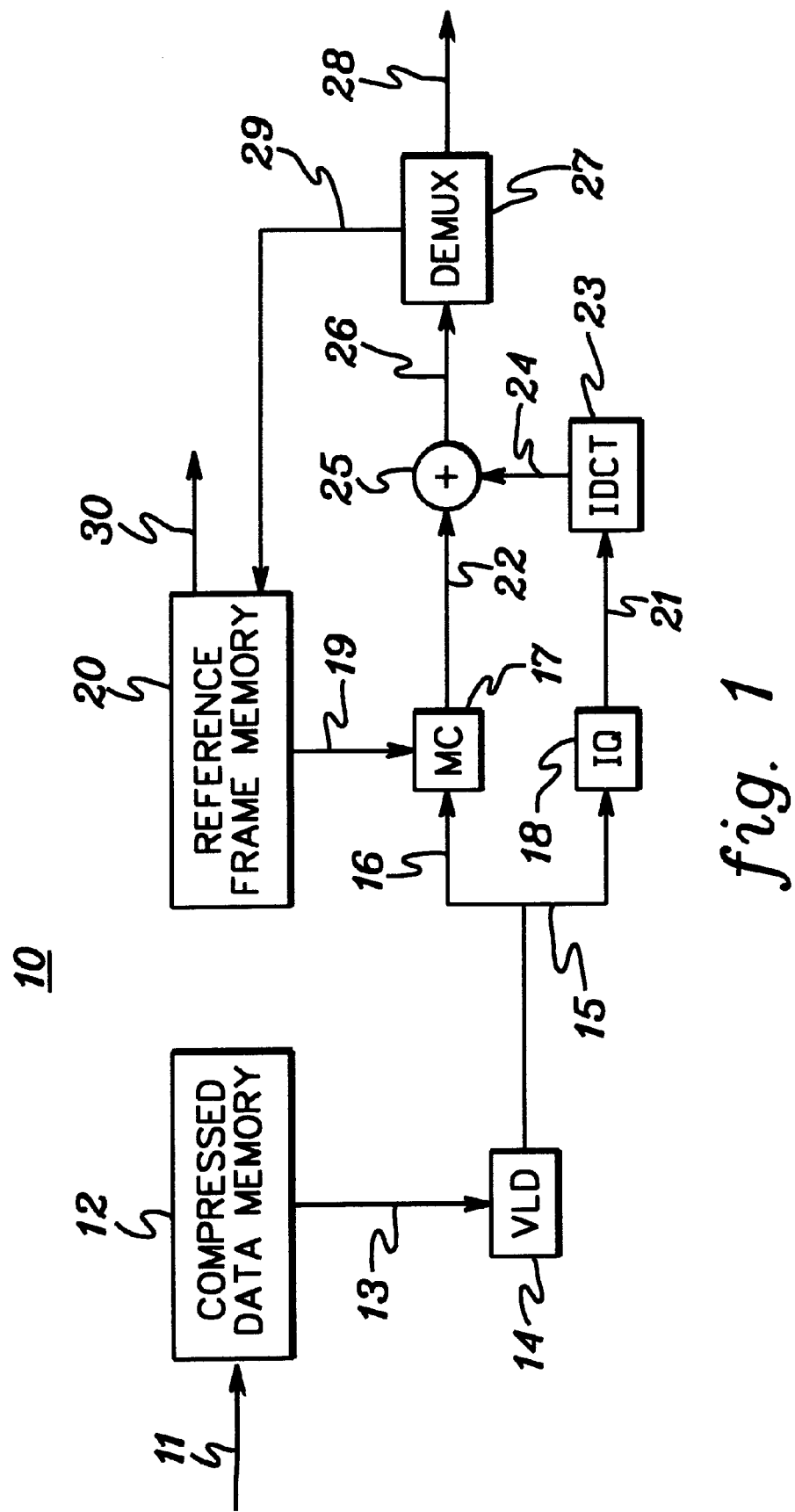
FIG. 1 depicts a general block diagram of a video decode unit.

FIG. 1 shows a diagram of a conventional video decode unit, which is briefly summarized. The compressed data enters as signal 11 and is stored in the compressed data memory 12. The variable length decoder (VLD) 14 reads the compressed data as signal 13 and sends motion compensation information as signal 16 to the motion compensation (MC) unit 17 and quantized coefficients as signal 15 to the inverse quantization (IQ) unit 18. The motion compensation unit reads the reference data from the reference frame memory 20 as signal 19 to form the predicted macroblock, which is sent as signal 22 to the adder 25. The inverse quantization unit computes the unquantized coefficients, which are sent as signal 21 to the inverse transform (IDCT) unit 23. The inverse transform unit computes the reconstructed difference macroblock as the inverse transform of the unquantized coefficients. The reconstructed difference macroblock is sent as signal 24 to the adder 25, where it is added to the predicted macroblock. The adder 25 computes the reconstructed macroblock as the sum of the reconstructed difference macroblock and the predicted macroblock. The reconstructed macroblock is then sent as signal 26 to the demultiplexer 27, which stores the reconstructed macroblock as signal 29 to the reference memory if the macroblock comes from a reference picture or sends it out (to memory or display) as signal 28. Reference frames are sent out as signal 30 from the reference frame memory.

Figure 2:
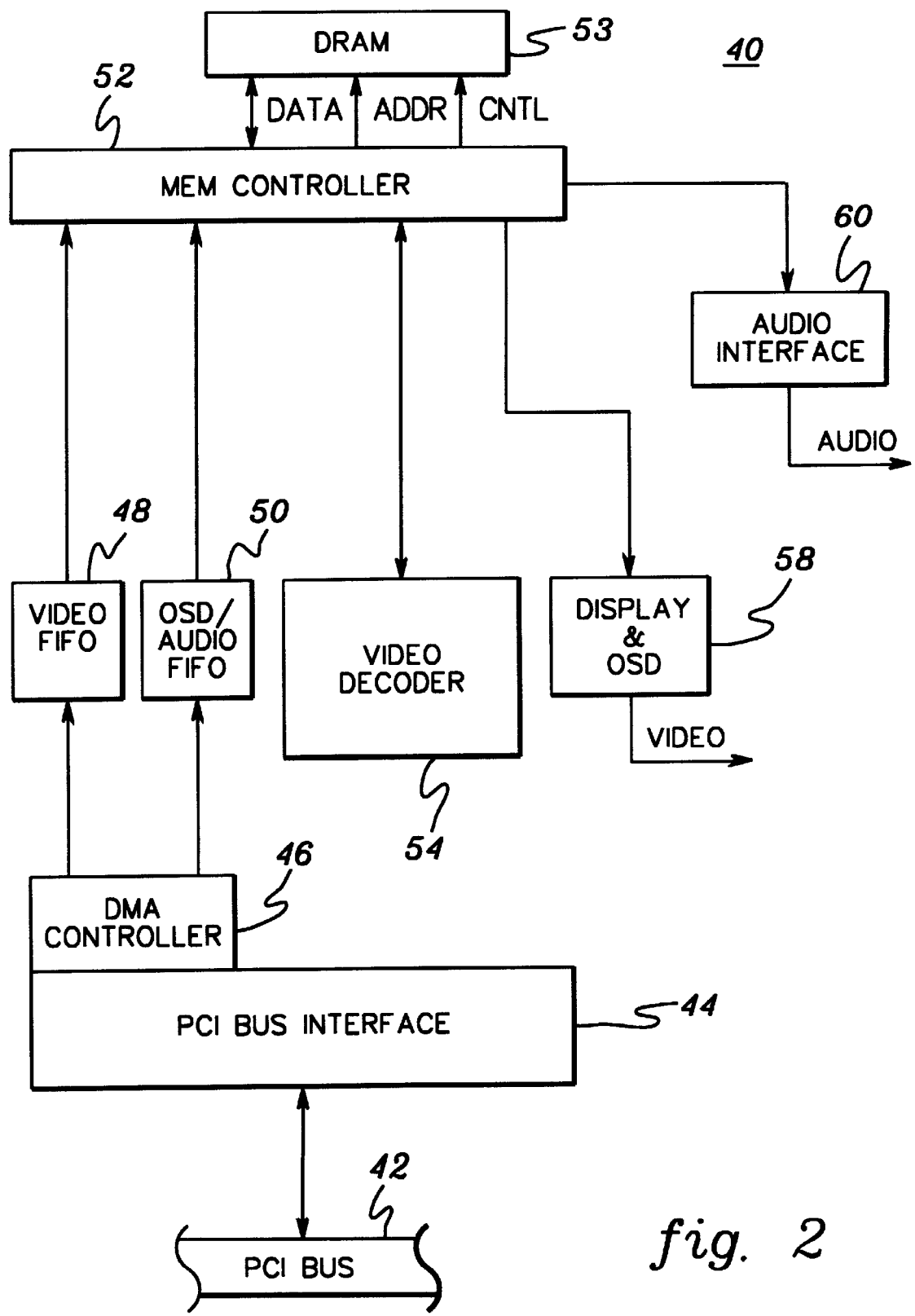
FIG. 2 is a block diagram of a video decode system to employ the principles of the present invention.

A decode system, generally denoted 40, to employ the present invention is depicted in FIG. 2. System 40 includes, e.g., a PCI bus interface 44 which couples the decode system 40 to a PCI bus 42. MPEG encoded video data is fetched from PCI bus 42 by a DMA controller 46 which writes the data to a video first-in/first-out (FIFO) buffer 48. The DMA controller also fetches on-screen display and/or audio data from PCI bus 42 for writing to an OSD/audio FIFO 50. A memory controller 52 will place video data into a correct memory buffer within dynamic random access memory (DRAM) 53. MPEG compressed video data is then retrieved by the video decoder 54 from DRAM 53 and decoded as described above in connection with FIG. 1. Conventionally, the decoded video data is then stored back into the frame buffers of DRAM 53 for subsequent use. When a reference frame is needed, or when video data is to be output from the decode system, stored data in DRAM 53 is retrieved by the MEM controller and forwarded for output via a display & OSD interface 58. Audio data, also retrieved by the video controller 52, is output through an audio interface 60.

This invention is directed in one aspect to an enhanced MEM controller 52 which allows pipelined transfer of data over a shared memory bus between the external memory (DRAM 53) and a data transfer requester within the decode system, such as video decoder 54.

Figure 3:
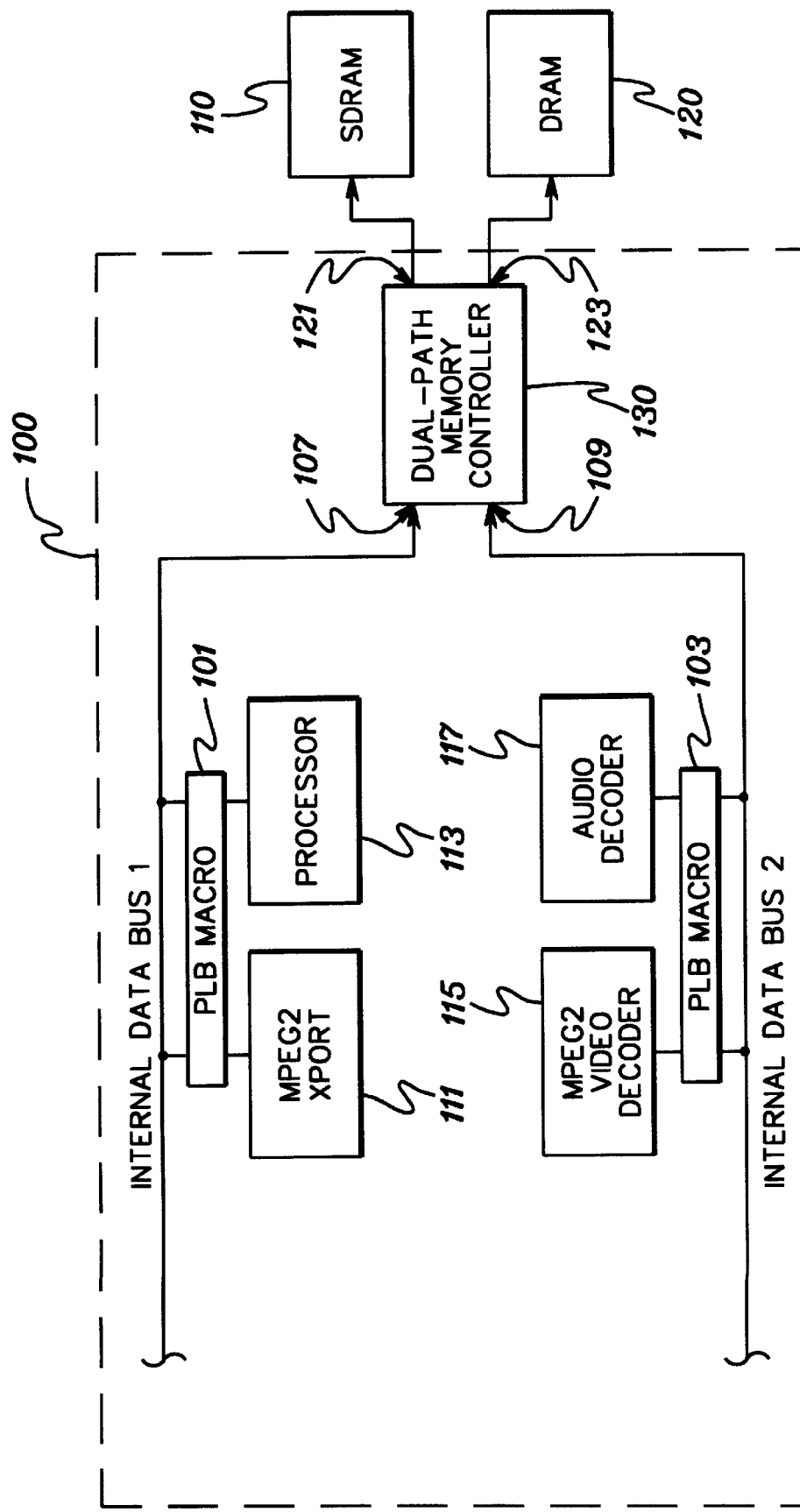
FIG. 3 is an example of an integrated system coupled to multiple external memories and having a shared, dual path memory controller for allowing shared access to the memories.

An example of an integrated architecture using a data transfer engine in accordance with the present invention for a "set-top box" to process digital television signals is depicted in FIG. 3. In this architecture, an integrated system 100 includes two primary internal data buses (i.e., internal data bus 1 & internal data bus 2), each of which may comprise a write data bus and a read data bus. Internal data buses 1 & 2 are alternately referred to herein as processor local buses (PLBs). Coupled to these internal data buses are multiple "functional units". As used herein, a "functional unit" is anything that can act as a master and request a read or write cycle from a slave device, such as memory. In the specific example shown, an MPEG-2 transport or XPORT 111 is coupled to internal data bus 1 for outputting requests through the data bus to external device ports 121 & 123 of system 100. Similarly, a processor 113 is coupled to internal data bus 1, and video decoder 115 and audio decoder 117 functions are coupled to internal data bus 2. The functional units logically connect to the respective internal data buses across appropriate processor local bus (PLB) macros (described further below).

Data bus 1 is connected to a first bus port, for example, 107 of a dual path memory controller 130 implemented in accordance with the teachings of commonly assigned U.S. application Ser. No. 09/047,139, entitled "Shared Access Controller Device For Integrated System With Multiple Functional Units Accessing External Structures Over Multiple Data Buses," the entirety of which is hereby incorporated herein by reference. Shared control 130 includes a dual ported switch with two ports on each side of the controller. This control device allows a request on any internal data bus to be sent to any device port. Further, the control device allows multiple requests, directed to different external devices, to be simultaneously forwarded from multiple internal data buses to the appropriate external device ports for simultaneous (or same cycle) accessing of the different external devices. Note that the number of internal data buses may be the same as the number of external devices or different. However, the ability to simultaneously process multiple requests for access to different external devices can depend upon both the number of internal data buses and the number of external devices to be concurrently accessed.

The external device ports 122 & 123 are coupled in this example to high speed memory SDRAM 110 and DRAM 120, respectively, as well as if desired, to a bus (not shown) to which other devices can be attached. The access control device 130 presents the appearance of a common address space to the functional units of the integrated system since all requests are through the multi-path access control device.

Note that the integrated system architecture 100 of FIG. 3 is presented by way of example only. The principles of the present invention may be employed with any shared data bus architecture wherein requests are to be sent from functional units of the architecture to a slave device, such as memory. The dual path memory controller 130 discussed above comprises one specific embodiment of such an integrated system architecture.

Figure 4:
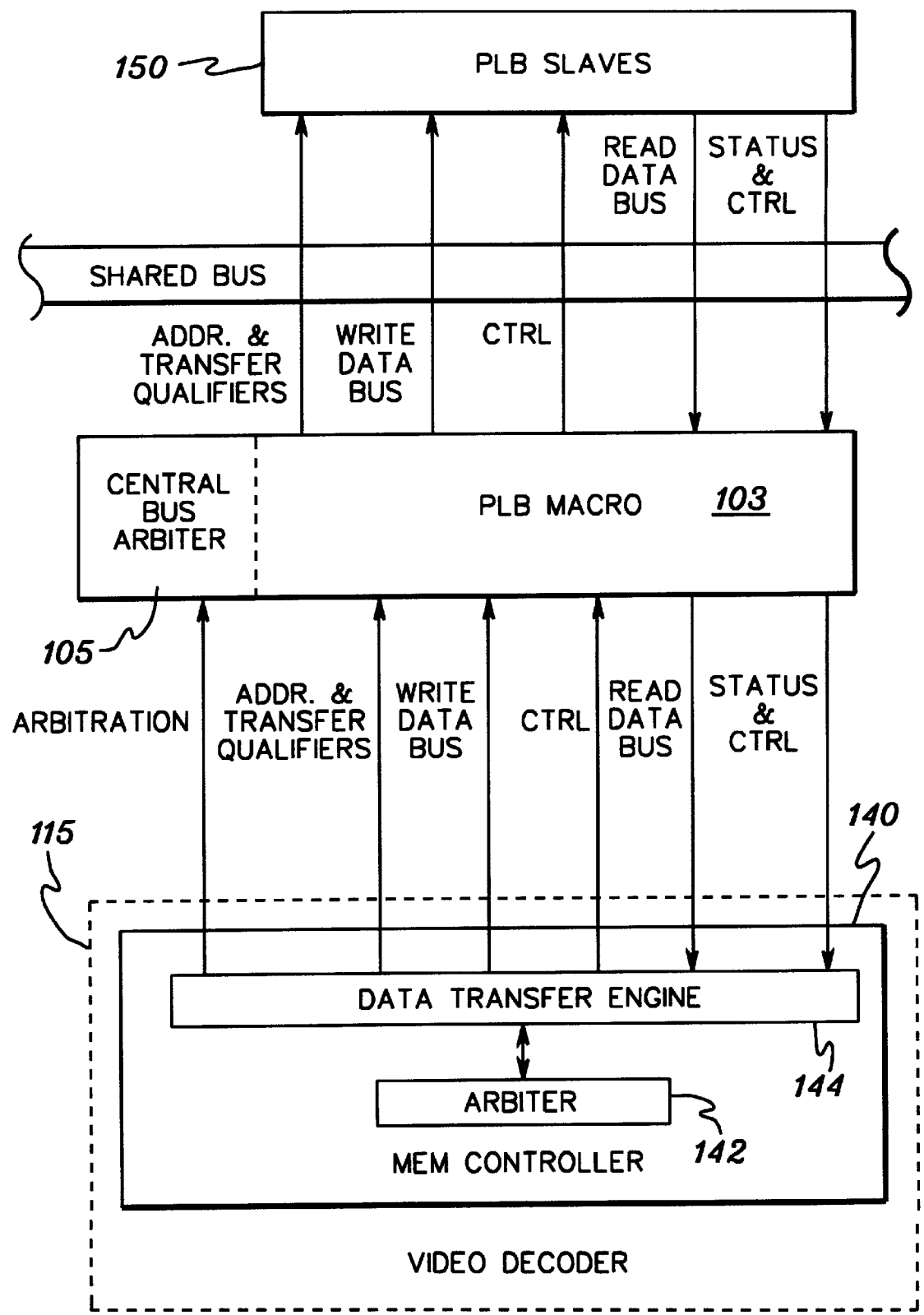
FIG. 4 depicts one example of processor local bus (PLB) protocol wherein a data transfer engine is employed in accordance with the principles of the present invention.

FIG. 4 presents an overview of shared bus protocol requirements for a video decoder having a memory (MEM) controller with a data transfer engine in accordance with the principles of the present invention. Video decoder 115 communicates with PLB slaves 150 through a PLB macro 103 which controls access to the shared bus coupling the video decoder and PLB slaves. In one embodiment, the PLB slaves comprise multiple memories to be accessed by the video decoder. Video decoder 115 includes a memory (MEM) controller 140 having an arbiter 142 and a data transfer engine 144 in accordance with the present invention.

In a dedicated memory environment, only data address and read/write controls are necessary. However, in a shared memory bus structure such as depicted in FIG. 4, separate controls and buses for read and writes are desired, and arbitration on the bus is required. Arbitration is controlled by a central bus arbiter 105. Video decoder 115 must request access to the bus through arbiter 142 and then wait for an acknowledgment from the central bus arbiter 105. As noted with respect to FIG. 3, other functional units within the integrated system (containing the video decoder) may also be attempting access to one or more slave devices across the shared bus.

Address and transfer qualifiers are forwarded through PLB macro 103 to the slave device once bus access is granted. If undertaking a write operation, data from decoder 115 is forwarded on a write data bus, as are control signals for bus control and gating logic within the PLB macro. If a read operation, data is received on a read data bus. Status and control signals are provided to controller 140 through PLB macro 103 from PLB slave 150. Note that data is transferred with the shared bus at a rate defined by the shared bus.

As shown, the data transfer engine of FIG. 4 is partitioned to handle reads and writes separately within the logic. This partitioning, in some cases, simplifies the controls and data flow within the logic design (discussed below with reference to FIGS. 5 & 6), but also allows for optimization of performance characteristics for each operation. In order to enhance performance of the data transfer engine in a shared bus environment pursuant to this invention, the parameters needed to characterize the transfers over the bus are preferably staged in a primary/secondary sequence of pipelined address controls. This staging allows address pipelining to be used if both primary and secondary parameter data sets are ready for consecutive transfer. Essentially, address pipelining is accomplished for one long request wherein multiple addresses are strung together during arbitration to eliminate dead cycles between requests and to eliminate the need for additional address acknowledgments from the PLB macro.

Figure 5:
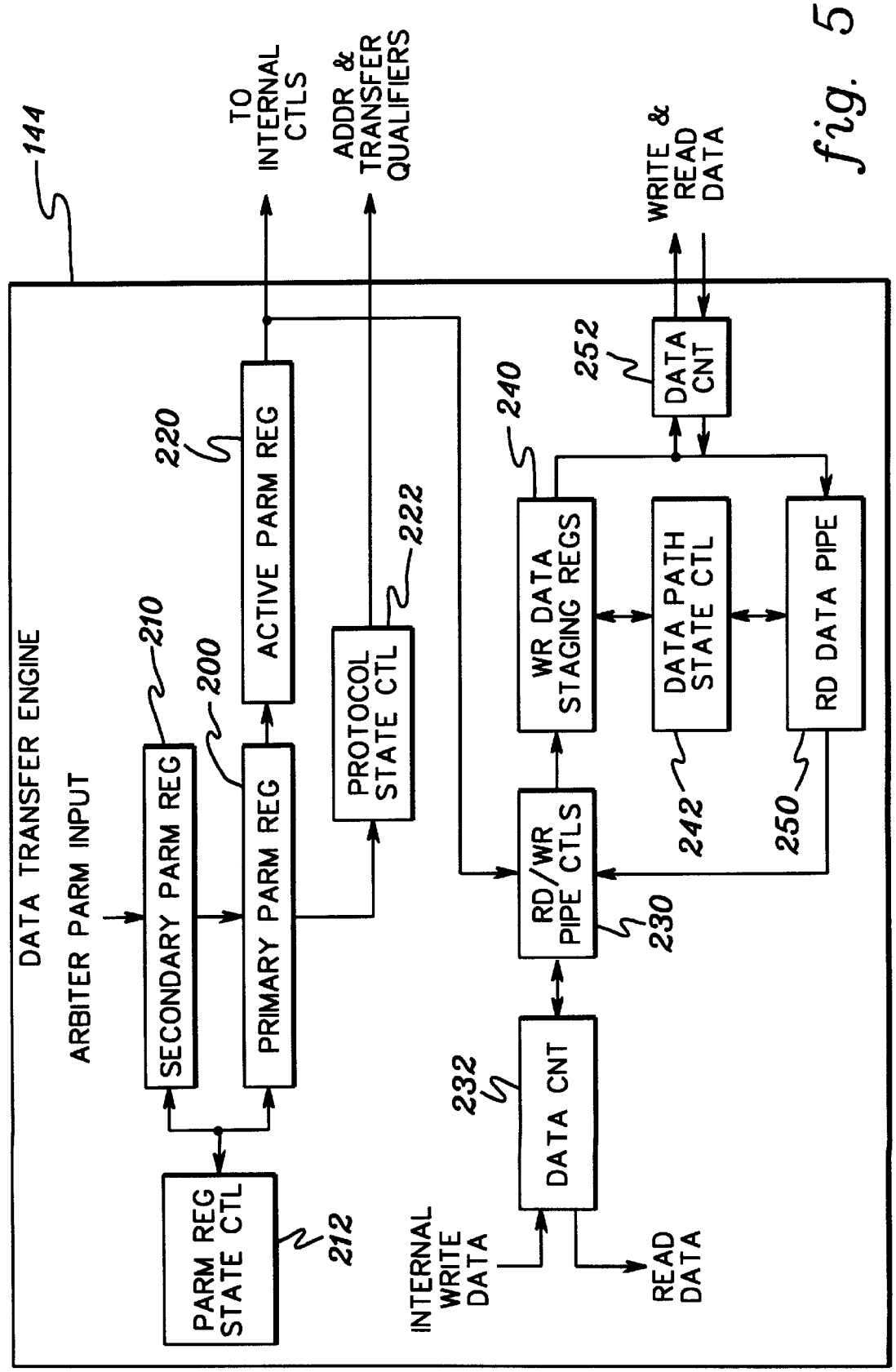
FIG. 5 depicts a logic diagram of one embodiment of a data transfer engine in accordance with the present invention.

FIG. 5 presents one embodiment of a data transfer engine 144 in accordance with the principles of the present invention. Structure 144 includes a primary parameter register 200 and a secondary parameter register 210 for use in pipelining requests onto the shared bus as described herein. Parameter input is received through arbiter 142 (FIG. 4) asynchronous to when data is to be transmitted across a shared bus. Parameter register state control 212 determines when there is valid data in registers 200 & 210 and when to move data from secondary parameter register 210 to primary parameter register 200 in accordance with the invention. In order to satisfy the protocol on the bus with pipelining, a copy of the current transfer parameter set is placed into an active parameter register 220 for internal use after initiation of a transfer and until the active transfer is complete. For example, once control of the bus is obtained, the transfer parameter set in the primary parameter register 200 can be copied into the active parameter register 220 for internal use in controlling data transfer.

As shown, the transfer parameter set in the active parameter register 220 is also provided to a read/write pipe control 230, discussed below. Protocol state control 222 controls the set of states necessary to go through arbitration for the shared bus and to put the address and transfer qualifiers onto the shared bus. Output from protocol state control 222 is the address and transfer qualifiers to be put out on the address bus (see FIG. 4). Each transfer parameter set includes identifying information on the given transfer, including length of data transfer, data alignment, whether the transfer comprises a read signal or a write signal, etc.

As shown in the embodiment of FIG. 5, the read and write paths are preferably designed with distinct data flow and controls. Read/write data is received through a data counter 252 which tracks how many words/bytes of data have been transferred. If a read operation, data is forwarded to a read data pipe 250. Data pipe 250 may comprise, for example, two registers which receive data from the shared bus and forward the data back to the requesting unit (pursuant to instructions from read/write pipe controls 230) through an internal "read data" bus. A data counter 232 is provided at this side of the logic as well to count data transferred to/from the requesting unit. Data counter 252, and data counter 232, ensure detection of transfer completion. For example, the counts within the two counters can be compared in order to detect completion of a data transfer and to notify both the requesting unit and shared bus side of the last transfer condition. As the bus supplies data to the transfer engine 144, the data path state machine 242 manages the storing and forwarding operation to the requesting unit within the video decoder at the rate of the shared bus, since this structure has control of the internal bus to the requesting unit needing the data.

For the write path, write data from the requester unit (not shown) within the decoder is pre-loaded into internal write data staging registers 240, while the transfer parameter set in the primary parameter register is employed to request access to the shared bus. Once a sufficient amount of write data is received from the requesting unit, the bus transfer can be initiated and the write data sent, again through data count 252. Once the transfer has begun, data controls maintain the write data staging registers 240 so that they remain full to ensure that data can be supplied at the rate required by the shared bus.

Figure 6:
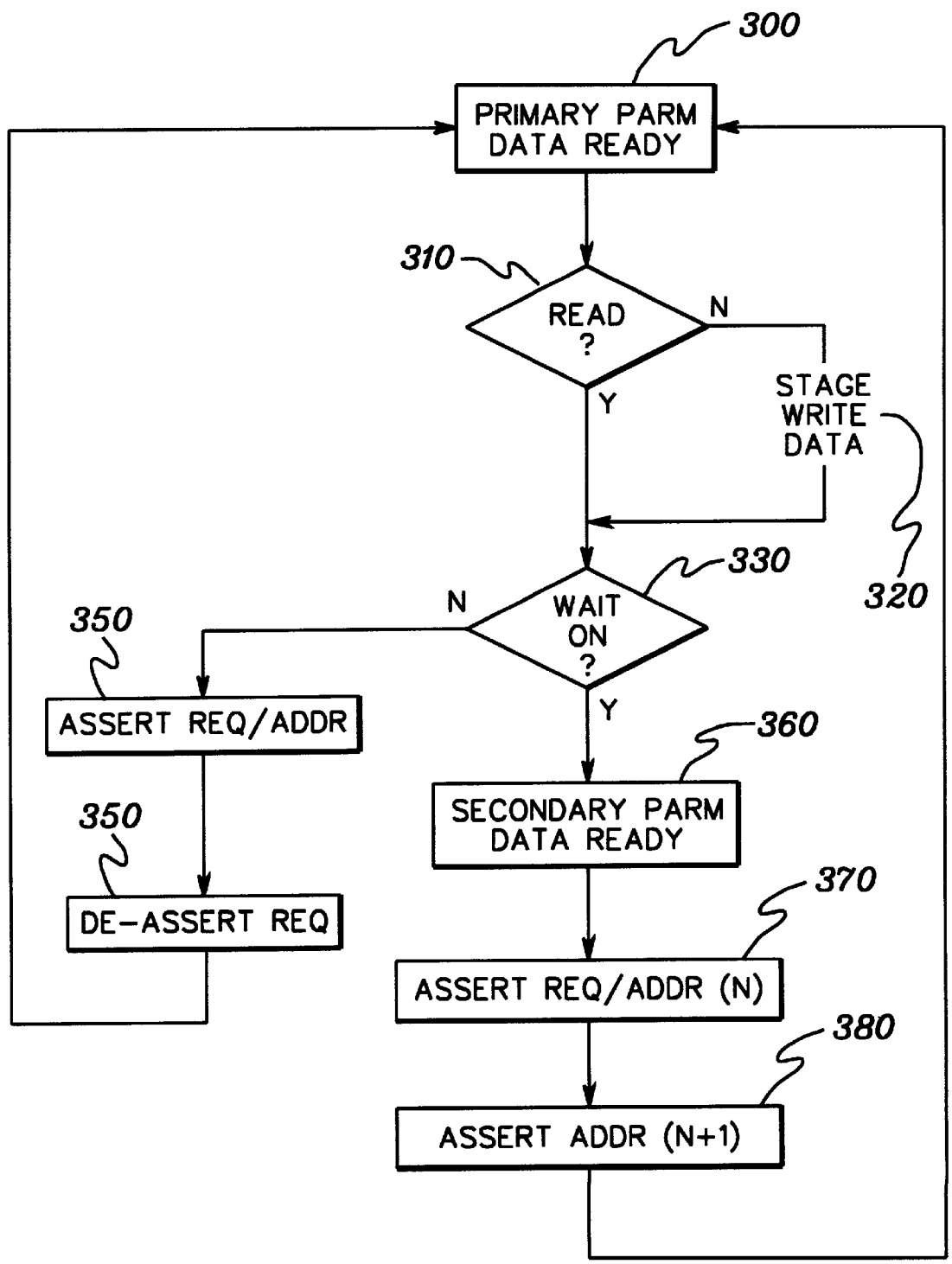
FIG. 6 is a flowchart of one process embodiment for pipelining data transfers across a shared memory bus in accordance with the principles of the present invention.

One embodiment of address pipelining in accordance with the present invention is depicted in FIG. 6. As noted, in order to correctly stage the transfer protocol parameters required to satisfy a pipelining condition, at least two parameter registers are set up. Pipelining can be established once a first transfer parameter set is placed into a primary parameter register and a second parameter set is placed into a second parameter register. Pipelining on the bus is achieved by keeping the request line active to the bus after acknowledgment of the first transfer parameter set.

Processing begins by recognizing that a first transfer parameter set in the primary parameter register is ready 300. Once data is ready, the parameter register state control determines whether the transfer parameter set comprises a read data request or write data request 310. If a write request, then the write data staging described above in connection with FIG. 5 is undertaken 320 to fill up the internal write data pipe before making the write request to ensure that data may be continuously transferred once the request is granted. Processing then determines whether to wait for a second transfer parameter set before proceeding with the request 330.

This "wait determination" or "wait decision" can be based on a number of factors. For example, the length of the data burst of the next transfer parameter set can be examined. If the data transfer burst is short, then it might be preferable to string the burst together with execution of the first transfer parameter set request. Further, the wait decision could be gated by the identity of the second requesting unit and/or pre-defined priority settings wherein different requesting units would have different request priorities. Identity of the requesting unit can also provide information on burst lengths and frequencies at which the unit requires data transfer. Further, the type of operations to be pipelined can be considered. In accordance with one embodiment, pipelining similar-type operations, i.e., back-to-back read or back-to-back write operations may be given priority, and/or pipelining requests to the same memory area. Essentially, the "wait on?" inquiry 330 is dynamically determining, based upon these or additional characteristics, whether performance would be enhanced by waiting for a second transfer parameter set before initiating a request for bus access.

Assuming that processing decides not to wait for the second parameter set, then in this instance, pipelining does not occur. The address of the first parameter set is put out, and a request for bus access is raised 340. After the request is acknowledged, the request is deasserted 350 and processing returns to await receipt of a next transfer parameter set in the primary parameter register.

If wait control 330 decides to wait for the second transfer parameter set, processing waits until the second transfer parameter set is ready within the secondary parameter register 360. Once the data is ready in both the primary parameter register and the secondary parameter register, then a request for bus access is asserted and the address of the first transfer parameter set (herein "N") is provided 370. Thereafter, the address of the second transfer parameter set "N+1" is asserted 380. The second set of parameters is provided as soon as an acknowledgment of the first transfer parameter set is received from the arbiter. There is no deasserting of the bus access request between transfers since the addresses are pipelined onto the bus. The central arbiter will know that pipelining is occurring and will look for each consecutive address as it is received.

Note that the example provided herein discusses pipelining two transfer parameter sets, however, greater than two parameter sets could be consecutively pipelined in accordance with the principles of the present invention. This could be accomplished using two parameter registers, such as the primary and secondary parameter registers described above, or greater than two parameter registers in the transfer engine.

Those skilled in the art will also note from the above discussion that the "wait decision" controller discussed herein comprises a situational wait with the time potentially changing with each set of consecutive transfer parameters being considered. The decision whether to wait or not wait is preferably an intelligent decision based upon the considerations discussed above. As an alternative, the wait decision could comprise a predefined time wait wherein pipelining automatically occurs if the second transfer parameter set is received within a predefined time interval of receipt of the first transfer parameter set.

To again summarize, a data transfer method/engine in accordance with the present invention can be used within, for example, a set-top box chip to allow enhanced memory accesses to external memory via a shared bus throughout the chip. A decode unit employing this data transfer engine can communicate with external memory via master/slave protocol on the shared bus, while also employing address pipelining to improve bandwidth on the bus. The method/engine disclosed can be generic to multiple integrated system configurations. The memory access engine is independent of the type of memory used, and is portable to other chip designs requiring an arbitrated or shared memory subsystem. Further, the data transfer method/engine presented provides performance optimization for burst transfers and can be tuned for other designs, e.g., through the 'wait control' function described.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of transferring data using a shared memory bus, comprising the steps of:
    receiving and storing a first transfer parameter set in a primary parameter register;
    receiving and storing a second transfer parameter set in a secondary parameter register; and
    transferring data with said shared memory bus in response to said first parameter set and said second parameter set without relinquishing access to said shared memory bus between transferring of data in response to said first parameter set and transferring of data in response to said second parameter set.

2. The method of claim 1, wherein said first parameter set is received from a plurality of data requesters, and said second parameter set is received from said plurality of data requesters, and wherein said plurality of data requesters comprise data requesters of a video decoder chip.

3. The method of claim 1, further comprising determining for each transfer parameter set whether said transfer parameter set comprises a write data request, and when said transfer parameter set comprises a write data request, said method further comprising staging said write data prior to said transferring data.

4. The method of claim 1, further comprising prior to said receiving and storing of said second transfer parameter set, determining whether to wait transferring data with said shared memory bus in response to said first parameter set until said receiving and storing of said second transfer parameter set in said secondary parameter register, said determining comprising a wait decision based upon at least one of a characteristic of said first transfer parameter set, a characteristic of said second transfer parameter set, identity of a data requester issuing said first transfer parameter set and identity of a data requester issuing said second transfer parameter set.

5. The method of claim 4, wherein said wait decision is based on said characteristic of said second transfer parameter set, said characteristic of said second parameter set comprising a data burst length pursuant to the second transfer parameter set.

6. The method of claim 4, wherein said wait decision is based on said characteristic of said first parameter set and said characteristic of said second parameter set, each said characteristic comprising a type of data transfer operation, said type of data transfer operation comprising a read operation or a write operation, and wherein said wait decision comprises waiting for receipt of said second parameter set when said first transfer parameter set and said second transfer parameter set both comprise write operations or both comprise read operations.

7. The method of claim 4, wherein said identity of said data requester issuing said second transfer parameter set is employed by said wait decision to determine priority of said second transfer parameter set, said priority of said second transfer parameter set determining whether to wait for receipt of said second transfer parameter set before transferring data with said shared memory bus in response to said first parameter set.

8. The method of claim 1, wherein said transferring data comprises:
    asserting a data transfer request on the shared memory bus;
    putting at least a portion of the first transfer parameter set onto the shared memory bus;
    receiving a first parameter set acknowledgment from an arbiter of the shared memory bus;
    putting at least a portion of the second transfer parameter set onto the shared memory bus; and
    receiving a second parameter set acknowledgment from said arbiter of the shared memory bus.

9. The method of claim 1, further comprising transferring said second transfer parameter set to said primary parameter register upon initiating transferring of data with said shared memory bus in response to said first transfer parameter set, and receiving and storing an additional transfer parameter set in said secondary parameter register, said transferring data including transferring data with said shared memory bus in response to said additional transfer parameter set without relinquishing access to said shared memory bus from said transferring data in response to said second transfer parameter set.

10. The method of claim 9, further comprising repeating said receiving and storing for n additional transfer parameter sets and said transferring data in response thereto without relinquishing access of said shared memory bus between transferring of data in response to each of said transfer parameter sets, wherein n>2, and wherein at least n data transfers can be pipelined without relinquishing access to said shared memory bus in response to said n additional transfer parameter sets received and processed through said primary parameter register and said secondary parameter register.

11. The method of claim 1, further comprising transferring at least a portion of said first transfer parameter set from said primary parameter register to an active parameter register after receipt of an acknowledgment from said shared memory bus for initiating said transferring data in response to said first transfer parameter set, said first transfer parameter set being transferred to said active parameter register for use during said transferring data.

12. A method of transferring data with a shared data bus, comprising the steps of:

accepting a first transfer parameter set from one of a plurality of data requesters, and storing said first transfer parameter set in a primary parameter register;

subsequent to said storing of said first parameter set, dynamically determining whether to wait for a second transfer parameter set from one of said plurality of data requesters, and if waiting, thereafter receiving and storing said second transfer parameter set in a secondary parameter register;

subsequent to storing of said second transfer parameter set, or if not waiting for said second transfer parameter set, requesting access to said shared data bus and transferring data with said data bus in response to said first transfer parameter set; and if said second transfer parameter set has been received, transferring data with said data bus in response to said second transfer parameter set, without relinquishing access to said data bus between said transferring of data in response to said first transfer parameter set and transferring of data in response to said second transfer parameter set.

13. The method of claim 12, wherein said first transfer parameter set is received from a plurality of data requesters, and said second transfer parameter set is received from said plurality of data requesters, and wherein said plurality of data requesters comprise requesting units of a video decoder, and wherein said shared data bus comprises a shared memory bus for use in accessing external memory.

14. The method of claim 12, further comprising determining for each transfer parameter set whether said transfer parameter set comprises a write data request, and when said transfer parameter set comprises a write data request, said method further comprising staging data to be written, said staging occurring prior to said transferring of data.

15. The method of claim 12, wherein said dynamically determining whether to wait comprises dynamically deciding based upon at least one of a characteristic of said first transfer parameter set, a characteristic of said second transfer parameter set, identity of a data requester issuing said first transfer parameter set and identity of a data requester issuing said second transfer parameter set.

16. The method of claim 15, wherein said characteristic of said first transfer parameter set comprises at least one of a data burst length or a type of data transfer operation required by said first transfer parameter set, and wherein said characteristic of said second transfer parameter set comprises a data burst length or a type of data transfer operation required by said second transfer parameter set.

17. The method of claim 15, wherein said identity of said data requester issuing said second transfer parameter set is employed to determine priority of said second transfer parameter set, said priority being employed during said dynamically deciding whether to wait for receipt of said second transfer parameter set before transferring data with said shared memory bus in response to said first transfer parameter set.

18. A data transfer engine for a bus access controller of a functional unit in an integrated system having a shared data bus coupling the functional unit to an external device, said data transfer engine comprising:

a primary parameter register for receiving and storing a first transfer parameter set;

a secondary parameter register for receiving and storing a second transfer parameter set; and control logic for initiating and controlling transfer of data across said shared data bus in response to said first transfer parameter set and said second transfer parameter set without relinquishing access to said shared data bus between transferring of data in response to said first transfer parameter set and transferring of data in response to said second transfer parameter set.

19. The data transfer engine of claim 18, wherein said functional unit comprises a video decode unit, said external device comprises external memory, and said shared data bus comprises a shared memory bus.

20. The data transfer engine of claim 18, wherein said functional unit comprises a plurality of data requesters, and wherein said first transfer parameter set and said second transfer parameter set are each received from said plurality of data requesters.

21. The data transfer engine of claim 18, wherein said external device comprises memory, and said integrated system comprises a memory controller, said memory controller further comprising an arbiter for said initiating of said transfer of data across said shared data bus.

22. The data transfer engine of claim 18, wherein said control logic further comprises an active parameter register coupled to said primary parameter register for receiving said first transfer parameter set therefrom upon said initiating of transfer of data across said shared data bus in response to said first transfer parameter set, wherein said first transfer parameter set is retained within said active parameter register for use by said control logic for said controlling said transfer of data across said shared data bus.

23. The data transfer engine of claim 18, wherein said control logic comprises a first data path for a transfer parameter set comprising a write request and a second data path for a transfer parameter set comprising a read request, said first data path for said write request comprising write data staging registers for internally storing data to be written in response to said transfer parameter set comprising said write request, said internally storing occurring prior to initiating of said transfer of data.

24. The data transfer engine of claim 23, wherein said control logic further comprises a read data path for receiving read data transferred across said shared data bus in response to said transfer parameter set comprising said read request.

25. The data transfer engine of claim 18, wherein said control logic comprises means for asserting a request to transfer data across said shared data bus in response to said first transfer parameter set and thereafter without relinquishing access to said shared data bus means for asserting a request to transfer data in response to said second transfer parameter set.

26. The data transfer engine of claim 18, wherein said control logic comprises means for dynamically determining whether to wait transferring data with said shared data bus in response to said first parameter set until receiving and storing said second transfer parameter set in said secondary parameter register, said means for dynamically determining comprising means for dynamically deciding based upon at least one of a characteristic of said first transfer parameter set, a characteristic of said second transfer parameter set, identity of a data requester issuing said first transfer parameter set and identity of a data requester issuing said second transfer parameter set.

27. The data transfer engine of claim 26, wherein said characteristic of said first transfer parameter set comprises at least one of a data burst length or a type of data transfer operation required by said first transfer parameter set, and wherein said characteristic of said second transfer parameter set comprises a data burst length or a type of data transfer operation required by said second transfer parameter set.

28. The data transfer engine of claim 26, wherein said identity of said data requester issuing said second transfer parameter set is employed to determine priority of said second transfer parameter set, and wherein said means for dynamically determining comprises means for employing said priority to determine whether to wait for receipt of said second transfer parameter set before transferring data with said shared memory bus in response to said first transfer parameter set.

29. A data transfer engine for a bus access controller of a functional unit in an integrated system having a shared data bus coupling the functional unit to an external device, said data transfer engine comprising:

means for accepting a first transfer parameter set from one of a plurality of data requesters within the functional unit, and for storing said first transfer parameter set in a primary parameter register;

means for dynamically determining whether to wait for a second transfer parameter set from one of said plurality of data requesters, and if waiting, for receiving and storing said second transfer parameter set in a secondary parameter register;

means for requesting access to said shared data bus and for transferring data with said data bus in response to said first transfer parameter, said transferring data occurring after storing said second transfer parameter set or if not waiting for said second transfer parameter set; and means for transferring data with said shared data bus in response to said second transfer parameter set if said second transfer parameter set has been received, without relinquishing access to said shared data bus between said transferring of data in response to said first parameter set and said transferring of data in response to said second parameter set.

30. The data transfer engine of claim 29, wherein said functional unit comprises a video decode unit, and wherein said shared data bus comprises a shared memory bus for use in accessing shared memory.

31. The data transfer engine of claim 29, further comprising for each transfer parameter set means for determining whether said transfer parameter set comprises a write data request, and if so, means for staging data to be written in at least one write staging register prior to said transferring of data.

32. The data transfer engine of claim 29, wherein said means for dynamically determining whether to wait comprises means for dynamically deciding based upon at least one of a characteristic of said first transfer parameter set, a characteristic of said second transfer parameter set, identity of a data requester issuing said first transfer parameter set and identity of a data requester issuing said second transfer parameter set.

33. The data transfer engine of claim 32, wherein said characteristic of said first transfer parameter set comprises at least one of data burst length or a type of data transfer operation required by said first transfer parameter set, and wherein said characteristic of said second transfer parameter set comprises a data burst length or a type of data transfer operation required by said second transfer parameter set.

34. The data transfer engine of claim 32, wherein said identity of said data requester issuing said second transfer parameter set is employed to determine priority of said second transfer parameter set, and wherein said means for dynamically deciding employs said priority to determine whether to wait for receipt of said second transfer parameter set before transferring data with said shared memory bus in response to said first transfer parameter set.

35. An integrated system comprising:

at least one shared data bus;

multiple functional units coupled to said at least one shared data bus for sending requests thereon to access at least one external device to be coupled to the integrated system; and a bus access controller for a functional unit of said multiple functional units in said integrated system, said bus access controller comprising a data transfer engine, said data transfer engine comprising:
   (i) a primary parameter register for receiving and storing a first transfer parameter set;
   (ii) a secondary parameter register for receiving and storing a second transfer parameter set; and
   (iii) control logic for initiating and controlling transfer of data across said at least one shared data bus in response to said first transfer parameter set and said second transfer parameter set without relinquishing access to said at least one shared data bus between transferring of data in response to said first transfer parameter set and transferring of data in response to said second transfer parameter set.

36. The integrated system of claim 35, wherein said functional unit having said bus access controller comprises a video decode unit, and wherein said at least one external device comprises at least one external memory, and said at least one shared data bus comprises at least one shared memory bus coupling said video decode unit to said at least one external memory.

37. An article of manufacture, comprising:

at least one computer usable medium having computer readable program code means embodied therein for causing pipelined data transfer using a shared data bus, the computer readable program code means in the article of manufacture comprising:
   (i) computer readable program code means for causing a computer to receive and store a first transfer parameter set;
   (ii) computer readable program code means for causing a computer to receive and store a second transfer parameter set; and
   (iii) computer readable program code means for causing a computer to transfer data with said shared data bus in response to said first transfer parameter set and in response to said second transfer parameter set without relinquishing access to said shared data bus between transferring of data in response to said first parameter set and transferring of data in response to said second parameter set.

38. An article of manufacture, comprising:

at least one computer usable medium having computer readable program code means embodied therein for causing transferring of data with a shared data bus, the computer readable program code means in the article of manufacture comprising:
   (i) computer readable program code means for causing a computer to accept a first transfer parameter set from one of a plurality of data requesters, and for storing said first transfer parameter set in a primary parameter register;

(ii) computer readable program code means for causing a computer to determine whether to wait for a second transfer parameter set from one of said plurality of data requesters, and if waiting, for receiving and storing said second transfer parameter set in a secondary parameter register;

(iii) computer readable program code means for causing a computer to request access to said shared data bus and to transfer data with said data bus in response to said first transfer parameter set after storing said second transfer parameter set or if not waiting for said second transfer parameter set; and (iv) computer readable program code means for causing a computer to transfer data with said shared data bus in response to said second transfer parameter set if said second transfer parameter set has been received, said transfer being without relinquishing access to said data bus between said transferring of data in response to said first transfer parameter set and said transferring of data in response to said second transfer parameter set.

* * * * *